United States Patent [19]

Ikari et al.

[11] Patent Number: 4,761,546
[45] Date of Patent: Aug. 2, 1988

[54] OPTICAL DISPLACEMENT MEASURING SYSTEM WITH NONLINEARITY CORRECTION

[75] Inventors: Motoo Ikari, Kyoto; Yuji Takada, Neyagawa; Shintaro Yamamoto, Nabari; Katsuhiro Teramae, Osaka; Makio Asai, Tatsuno, all of Japan

[73] Assignee: Matsushita Electric Works, Ltd., Osaka, Japan

[21] Appl. No.: 929,417

[22] Filed: Nov. 12, 1986

[30] Foreign Application Priority Data

Nov. 25, 1985 [JP] Japan .................................. 60-264275

[51] Int. Cl.$^4$ ............................ G01J 1/20; G01C 3/00
[52] U.S. Cl. ........................................ 250/201; 356/1; 356/4
[58] Field of Search .................... 250/201, 204, 561; 356/1, 4; 354/403

[56] References Cited

U.S. PATENT DOCUMENTS

| | | | |
|---|---|---|---|
| 3,612,890 | 10/1971 | Cornyn, Jr. et al. | 250/222 |
| 3,885,872 | 5/1975 | Howe, Jr. et al. | 356/1 |
| 3,937,574 | 2/1976 | Peckham et al. | 356/4 |
| 4,445,029 | 4/1984 | Nagaoka et al. | 250/201 |
| 4,464,053 | 8/1984 | Bodlaj | 356/1 |
| 4,621,917 | 11/1986 | Kaneda | 354/403 |
| 4,673,274 | 6/1987 | Nagaoka et al. | 354/403 |

*Primary Examiner*—David C. Nelms
*Assistant Examiner*—Michael Messinger
*Attorney, Agent, or Firm*—Burns, Doane, Swecker & Mathis

[57] ABSTRACT

An optical displacement measuring system utilizing a triangulation is so arranged that light receiving means receives light reflected back from an object to be measured and generates a pair of output signals having mutually opposite values and responsive to a position of a light spot on the light receiving means. An operational means performs addition and subtraction over the pair of positional output signals and to obtain a ratio between the both added and subtracted output signals for generating a measured distance signal, and a linearity correcting means provides a mathematical correction number to one of the pair of positional output signals to correct any nonlinearity of the measured distance signal, for providing the linearity to the measured distance signal with a simple arrangement.

11 Claims, 8 Drawing Sheets

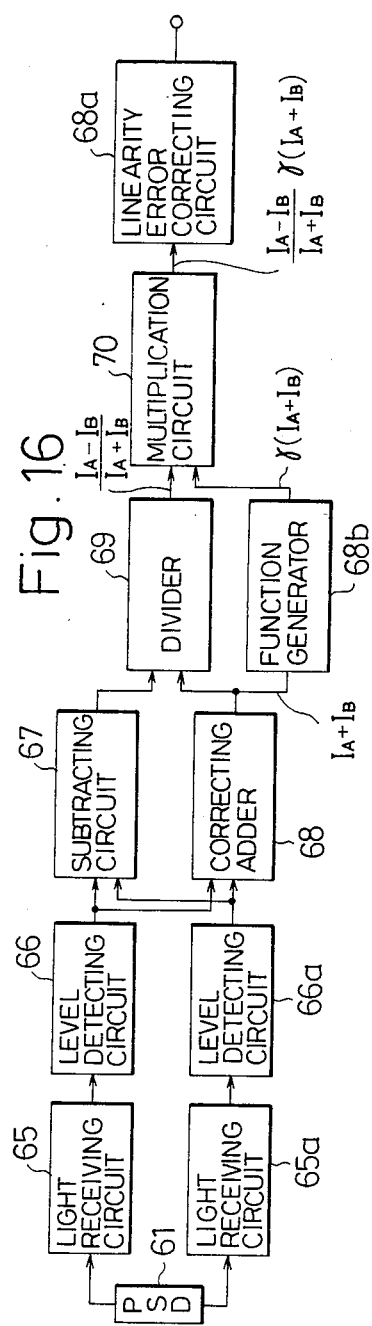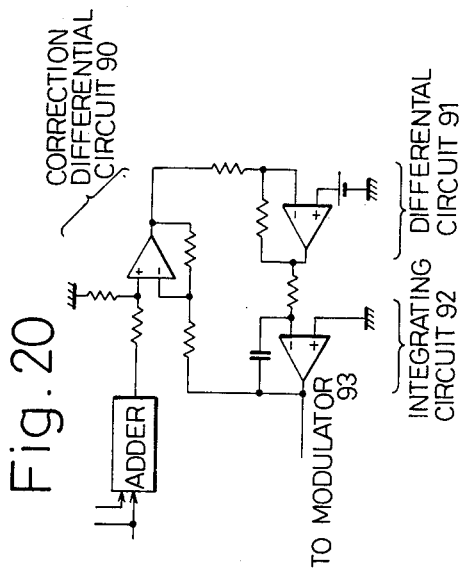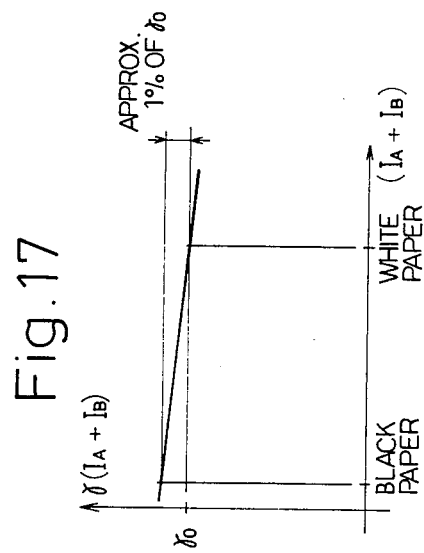

OPTICAL DISPLACEMENT MEASURING SYSTEM WITH NONLINEARITY CORRECTION

TECHNICAL BACKGROUND OF THE INVENTION

This invention relates to optical displacement measuring systems utilizing a triangulation and, more particularly, to a system for optically measuring displacements of an object by means of the triangulation while correcting measured displacing distance in respect of its linearity.

The optical displacement measuring system of the type referred to can be effectively applied to machine tools, mass production lines of cars and the like fields which requiring highly precise positioning of machining works, because of the ability of the system to highly precisely detect the displacement of the object.

DISCLOSURE OF PRIOR ART

Generally, these have been proposed various types of the systems for optically measuring the displacement of an object to be measured by means of triangulation, and U.S. Pat. No. 3,612,890 to William S. Cornyn, Jr. et al discloses a basic one of such systems which is effective to determine the displacing distance, that is, any variation in the distance being measured. In this U.S. patent, a light beam is projected from a source onto the object, reflected light from the object is made incident through a focusing lens onto a photosensor of a light receiving means, and an operational means provides displaced position signals according to any displacement in the position of the reflected light on the photosensor. The optical displacement measuring system by the triangulation of this U.S. patent enables it possible to highly precisely meassure the displaced position of the object and has been sufficiently satisfactory as a basic measuring technique.

In the above known measuring system, on the other hand, a measured distance signal Lo sent out from the operational means has a following relationship to a displacement distance $\Delta l$ of the object. Assuming that a distance $l$ between the light source and the object is $l_c + \Delta l$ (where $l_c$ is a distance between the light source and the object when the reflected light passed through the lens is focused on the center of the photosensor, and $\Delta l$ is a distance by which the object is displaced), F is a distance between the lens and the photosensor, $\Delta x$ is a displaced distance by which the reflected light through the lens is displaced from the center of the photosensor due to a displacement of the object, and $\theta$ is an intersecting angle between optical axes of the source light and of the lens and photosensor:

$$(l_c/\cos\theta + \Delta l \cos\theta)\Delta x = \Delta l (\sin\theta) F$$

$$\Delta x = (\tan\theta) F \Delta l / (l_c/\cos^2\theta + \Delta l)$$

If $a = (\tan\theta)F$ and $b = l_c/\cos^2\theta$, then $$\Delta x = a\Delta l/(b+\Delta l) \quad (1)$$

Here, it will be understood that the displaced distance $\Delta x$ has a nonlinear relationship to the displacement distance $\Delta l$.

While the operational means allows to obtain an incident-position signal of the reflected light on the photosensor, the displaced distance $\Delta x$ will have such relationship to the incident-position signal as expressed by an equation (2) as follows, wherein $I_A$ is an incident-position signal upon a displacement of the incident reflected light in one direction from the center of the photosensor, $I_B$ is another indicent-position signal of a displacement in another direction, and $l_P$ is an effective length of the photosensor:

$$(I_A - I_B)/(I_A + I_B) = \Delta x/l_P \quad (2)$$

As will be clear from the above equations (1) and (2), the measured distance signal Lo from the operational means which containing information on the displacement distance $\Delta l$ of the object has no linearity with respect to the displacement distnace $\Delta l$. Accordingly, it has been demanded for this type of the system which can be mostly used under such a condition that the distance between the light source and the measuring object always varies either to a large or small extent, that the system maintains a high measuring precision in the displacement distance $\Delta l$ with a high linearity to the measured displacement distance signal.

In view of this respect, there has been suggested an improved arrangement that can realize the highly precise measurement of the variable distance between the light source and the object and can provide a measured distance signal L having a sufficient linearity to any change in the distance. In this improved arrangement, an attempt has been made in that a correction signal is properly provided to the measured distance signal Lo of the operational means, from a digital operational circuit including a memory means for storing a preliminarily obtained corrective value to correct an anticipated nonlinearity of the signal Lo and a CPU for performing such corrective operation. However, this arrangement has had such problems that, to realize a high resolution and a high distance measuring precision the memory means is required to have a considerably large storage capacity, and the corrective value must be set optimumly in view of manufacturing tolerance of constituent parts of the system, which requirements rendering the system to become expensive, complicated in adjusting works, and unsuitable for the mass production.

TECHNICAL FIELD OF THE INVENTION

A primary object of the present invention is, therefore, to provide an optical displacement measuring system utilizing a triangulation, in which measured distance signals for an object with respect to a light projecting means can be provided with the linearity by a simple correcting means, even when the distance between the light projecting means and the object varies to a relatively large extent.

According to the present invention, the above object is realized by providing an optical displacement measuring system utilizing a triangulation wherein a light beam from a light projecting means is projected onto an object to be measured, light reflected by the object is passed through an optical condensing means to be incident as a condensed light spot on a light receiving means which generating a pair of output signals of mutually opposite values responsive to a position of the light spot, and an operational means obtains a distance between the light projecting means and the object to generate a measured distance signal on the basis of the output signals generated by the light receiving means; wherein the operational means is provided to perform addition and subtraction on each of the pair of the positional output signals to obtain a ratio between the both input signals for generating the measured distance signal, and a mathematical correction number provided by a linearity correcting means is applied to one of the pair of the positional output signals to correct nonlinearity of the measured distance signal.

According to the present invention arranged as above, there can be provided an optical displacement measuring system which can provide a linearity to the measured distance signal with a simple arrangement without requiring such complicated and expensive parts as the memory means which likely to be of a relatively large memory capacity and CPU or the like to be associated with the memory means, so that the system can be made unsuitable for being used in mass production lines and manufactured inexpensively.

Other objects and advantages of the present invention shall be made clear from the following description of the invention detailed with reference to preferred embodiments shown in accompanying drawings.

BRIEF EXPLANATION OF THE DRAWINGS

FIG. 5 is a graph showing relationship between the linearity error and the condensed light spot incident on typical light receiving means;

FIG. 6 is a block circuit diagram showing another embodiment of the measuring system according to the present invention;

FIG. 7 is a graph showing relationship between the linearity error and the displacement distance of the object to be measured in the system of FIG. 6;

FIG. 9 is a graph showing relationship between the displacement distance of the measuring object and a pair of positional output signals generated in the system of FIG. 8;

FIGS. 15 and 16 are block circuit diagrams showing further embodiments of the measuring system of the present invention;

FIG. 17 is an input characteristic diagram of a function generating circuit in the system of FIG. 16;

FIG. 20 shows a practical example of a correction differential circuit in the system of FIG. 19;

Figure 4:
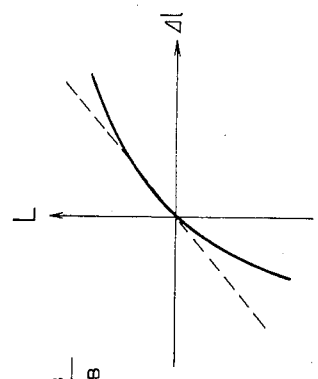
FIG. 4 is a graph for explaining the linearity correcting operation in the block circuit diagram of the system of FIG. 1.

While the present invention shall now be described with reference to the preferred embodiments shown in the drawings, it should be understood that the intention is not to limit the invention only to the particular embodiments shown but rather to cover all alterations, modifications and equivalent arrangements possible within the scope of the appended claims.

DISCLOSURE OF PREFERRED EMBODIMENTS

Figure 1:
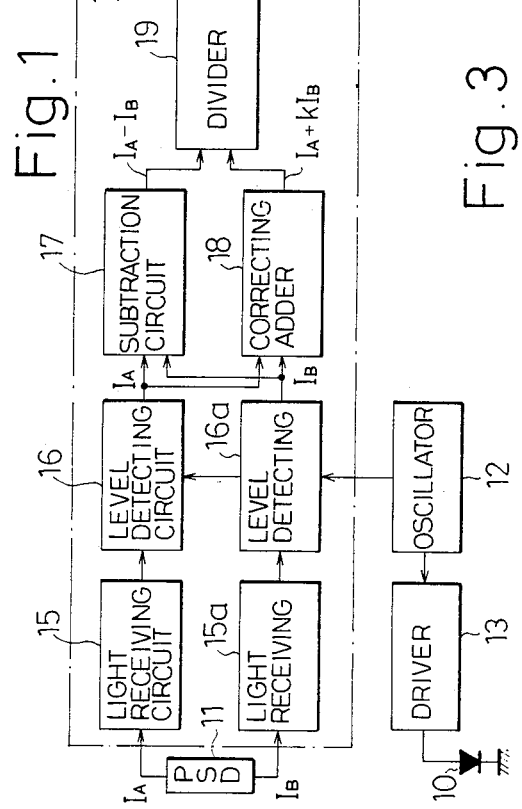
FIG. 1 is a block circuit diagram showing an embodiment of the optical displacement measuring system according to the present invention.
Figure 3:
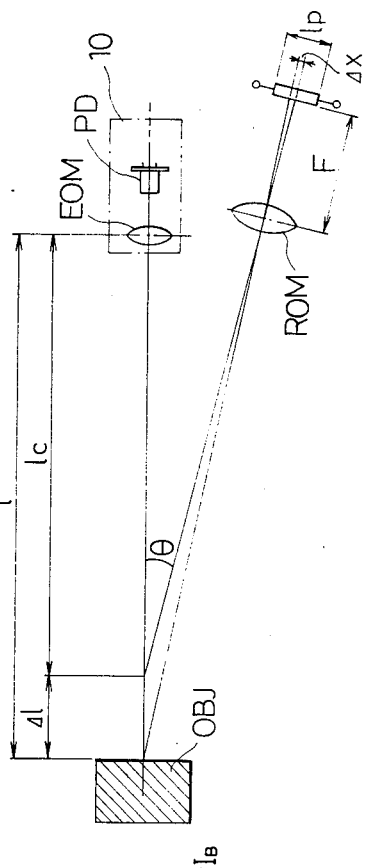
FIG. 3 is a diagram for explaining the distance measuring operation of the system of FIG. 1.

Referring to FIG. 1, an optical displacement measuring system utilizing a triangulation according to the present invention includes a light projecting means 10 and a light receiving means 11, which are arranged, as will be clear from FIG. 3, to realize the triangulation. The light projecting means 10 includes, for example, a photodiode PD which is turned ON to emit light by a driver circuit 13 receiving an output of an oscillator 12 generating a clock pulse for setting timing of the light emission, and the emitted light is passed through such an optical means for light projection as a lens to be projected as a light beam onto an object OBJ to be measured or detected as located in a detection area or entering thereinto. Light reflected back from the object OBJ is passed and condensed through such an optical means ROM for light reception as a lens, and is then caused to be incident on such light receiving means 11 as, for example, a one-dimensional position detecting element (which shall be referred to hereinafter as "PSD") so that PSD generates a pair of positional output current signals $I_A$ and $I_B$ flowing in mutually opposite directions, depending on incident position of the reflected light beam, in other words, a deviated distance $\Delta x$ of condensed light spot on PSD through the optical receiving means ROM with respect to the center of PSD.

Connected to PSD is an operational means 14 for an operation of the distance l between the light projecting means 10 and the object OBJ on the basis of the positional output signal $I_A$ and $I_B$. The operational means 14 includes light receiving circuits 15 and 15a which amplify respective currents of the positional output signals $I_A$ and $I_B$ and convert them to voltage signals respectively (while the symbol "I" indicates a current signal, the symbols $I_A$ and $I_B$ are used for convenience sake for the output signals converted from the current signals to the voltage signals, since the ratio of $I_A$ and $I_B$ does not vary even after being converted to the voltage signals). The light receiving circuits 15 and 15a are connected to level detecting circuits 16 and 16a which respectively receive the clock pulse from the oscillator 12 connected to the driver circuit 13 and discriminate the levels of the positional output signals $I_A$ and $I_B$ in synchronism with the clock pulse respectively, while the level detecting circuits 16 and 16a are connected respectively to a subtraction circuit 17 and a corrective adder circuit 18. The subtraction circuit 17 functions to subtract the positional output signal $I_B$ from the positional output signal $I_A$ and provides a first operational signal $(I_A-I_B)$.

Figure 2:
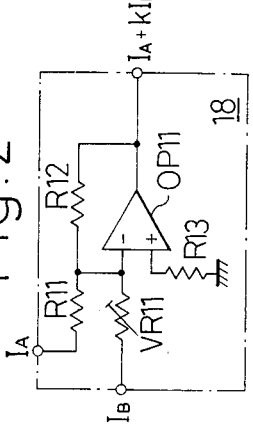
FIG. 2 shows a practical example of a correcting adder circuit in the block circuit diagram of FIG. 1.

On the other hand, the corrective adder circuit 18 is of an arrangement featured according to the present invention, and provides a second operational signal $(I_A+kI_B)$ by multiplying one of the positional output signals, $I_B$, from the level detecting circuit 16a with a correction constant k acting to provide the linearity to the measured distance signal L as will be disclosed later and adding it to the other positional output signal $I_A$. More definitely, the corrective adder circuit 18 includes, as shown in FIG. 2, an operational amplifier OP11, a variable resistor VR11 and resistors R11, R12 and R13, which are so arranged that, when the operational amplifier OP11 performs an addition between the positional output signal $I_A$ applied to an end of the resistor R11 and the other positional output signal $I_B$ applied to an end of the variable resistor VR11, the variable resistor VR11 is adjusted for having the correction constant k provided to the positional output signal $I_B$, and thereby the second operational signal $(I_A+kI_B)$ can be provided out of an output terminal of the operation amplifier OP11.

The first operational signal $(I_A-I_B)$ from the subtraction circuit 17 and the second operational signal $(I_A+kI_B)$ from the corrective adder circuit 17 are further sent to a divider circuit 19 for providing at its output terminal a ratio output signal $(I_A-I_B)/(I_A+kI_B)$, as an output of the operational means 14. This ratio output signal is indicative of the distance l between the light projecting means 10 and the object OBJ and is to be the measured distance signal L having the linearity. Therefore, even when the object OBJ is displaced away from the light projecting means 10 by a distance $\Delta l$ from a position of a distance $l_c$ from the means 10 (FIG. 3), the light reflected from which position being incident at the center of PSD11 as has been described with reference to the known system, any non-linearity is reduced to a large extent or eliminated as will be clear from the equations (1) and (2).

That is, the output signal $(I_A-I_B)/(I_A+kI_B)$ obtained as the measured distance signal L by multiplying the positional output signal $I_B$ with the correction constant k and adding it to the positional output signal $I_A$ allows such equations as follows to be led out:

$$(I_A - I_B)/(I_A + kI_B) = \{l_p + \Delta x - (l_p - \Delta x)\}/\{l_p + \Delta x + k(l_p - \Delta x)\}$$
$$= 2\Delta x/\{(1 + k)l_p + (1 - k)\Delta x\}$$
$$= 1/\{(1 + k)l_p/2\Delta x + (1 - k)/2\}$$

Substituting $a\Delta l/(b+\Delta l)$ for $\Delta x$ in the above equation, it becomes:

$$=1/\{(1+k)(b+\Delta l)l_p/2a\Delta l+(1-k)/2\}$$

$$=1/\{(1+k)l_p/2a+(1+k)bl_p/2a\Delta l+(1-k)/2\}$$

Therefore, conditions for that the measured distance signal L has the linearity will be:

$$(1+k)l_p/2a+(1-k)/2=0$$

Solving this equation:

$$k=\{\tfrac{1}{2}+l_p/2a\}/\{\tfrac{1}{2}-l_p/2a\} \qquad (3)$$

In the above equations, $l_p$ is the effective length of PSD11, $\Delta x$ is the deviated distance of the light spot incident on PSD11 from its center point, "a" is $(\tan\theta)F$, "b" is $l_c/\cos^2\theta$, F is a distance between the optical receiving means ROM and PSD11, $\theta$ is an intersecting angle between the both optical axes of the light projecting and receiving means 10 and 11, and $l_c$ is a distance between the light projecting means 10 and the object OBJ when light reflected from the object is incident at the center of PSD11 and is substantially of the same factor as that has been described with reference to the known system.

By adjusting the variable resistor VR11 in FIG. 2 so that the correction constant k satisfies the above equation (3), any non-linearity can be made to be zero and the measured distance signal L can have such a linearity as shown by a dotted line in FIG. 4. With this arrangement, the linearity correction can be effected only by adjusting the single variable resistor VR11 and a simple correction arrangement can be provided.

In the corrective adder circuit 18 of FIG. 2, a replacement of the variable resistor VR11 by the resistor R11 allows the correction constant k to be provided to the positional output signal $I_A$ given to the corrective adder circuit 18, so that $L=(I_A-I_B)/(kI_A+I_B)$, and substantially the same linearity correction as in the foregoing embodiment can be provided to the measured distance signal L.

As another aspect of the invention, the subtraction circuit 17 may be omitted from the system of FIG. 1 so that the output signal $I_A$ of the level detecting circuit 16 will be directly provided to the divider circuit 19, also for obtaining the measured distance signal L of $I_A/(I_A+kI_B)$. In the present instance, such equations as follows are satisfied:

$$I_A/(I_A + kI_B) = (l_p + \Delta x)/\{l_p + \Delta x + k(l_p - \Delta x)\}$$
$$= (l_p + \Delta x)/\{(1 + k)l_p + (1 - k)\Delta x\}$$

Substituting $a\Delta l/(b+\Delta l)$ for $\Delta x$ in the above equation:

$$=\{bl_p+(l_p+a)\Delta l\}/\{bl_p(1+k)+(kl_p+l_p+a+ak)\Delta l\}$$

Hence, when the correction constant k is adjusted so that $\Delta l$ term in the denominator on right side of the above equation becomes zero, the result is:

$$I_A/(I_A+kI_B)=A\Delta l+B$$

where, A and B are constants. In this way, the linearity correction can be carried out for the measured distance signal L. On the other hand, even when the output signal $I_A$ is directly provided in the divider circuit 19 and is also provided to the corrective adder circuit 18 after being provided with the correction constant k to have the measured distance signal L of $I_A/(kI_A+I_B)$ obtained, the linearity correction can be carried out.

Further, the linearity correction for the measured distance signal can be realized even when the subtraction circuit 17 is omitted from the system of FIG. 1 and the output signal $I_B$ from the level detecting circuit 16a is provided directly to the divider circuit 19 to obtain the measured distance signal L of $I_B/(I_A+kI_B)$, or even when the other output signal $I_A$ is provided directly to the divider circuit 19 and also to the corrective adder circuit 18 after being provided with the correction constant k for obtaining the measured distance signal L of $I_B/(kI_A+I_B)$.

In the system of FIG. 1, a disposition of an adder circuit in place of the subtraction circuit 17 as well as a disposition of a corrective subtraction circuit in place of the corrective adder circuit 18 will also result in a procurement of also $L=(I_A+I_B)/(I_A-kI_B)$, in which event:

$$(I_A + I_B)/(I_A - kI_B) = \{l_p + \Delta x + (l_p - \Delta x)\}/\{l_p + \Delta x - k(l_p - \Delta x)\}$$
$$= (2bl_p + 2l_p\Delta l)/\{bl_p(1 - k) + (l_p - kl_p + a + ak)\Delta l\}$$

When the correction constant k is adjusted so that the $\Delta l$ term in a denominator on right side of the above equation becomes zero, the linearity correction can be achieved for the measured distance signal L. Similarly, the measured distance signal L can be corrected to be linear when the output signal $I_A$ is provided with the correction constant k in the above corrective subtraction circuit to obtain the signal $L=(I_A+I_B)/(kI_A-I_B)$.

According to another feature of the present invention, not only the correction of the non-linearity generated upon displacement of the measuring object by means of such provision of the correction constant k as has been referred to, it is also made possible to correct any error which the light receiving means, for example, PSD itself involves or the operational means generates. As seen in FIG. 5, in practice, the displacement of the incident light spot position from the center of PSD causes such a linearity error as shown by a curve AV with respect to a theoretical value TV to be generated, and this error eventually affects the measured distance signal obtained as subjected to the linearity correction by means of the correction constant k. For this reason, it is desired to correct the linearity error.

In the present feature, as shown in FIG. 6 and as will be clear when compared with the system of FIG. 1, the measured distance signal L from a divider circuit 29 is fed back to a corrective adder circuit 28, and the correction constant k generated in the circuit 28 is provided with a function k(L) of the distance between the light projecting means and the object as obtained from the signal L before being sent to the divider circuit 29. As a result, the divider circuit 29 generates a measured distance signal $L=(I_A-I_B)/(I_A+k(L)I_B)$, in which case, as will be clear from FIG. 7, larger the distance function k(L), larger than linearity characteristic.

Figure 8:
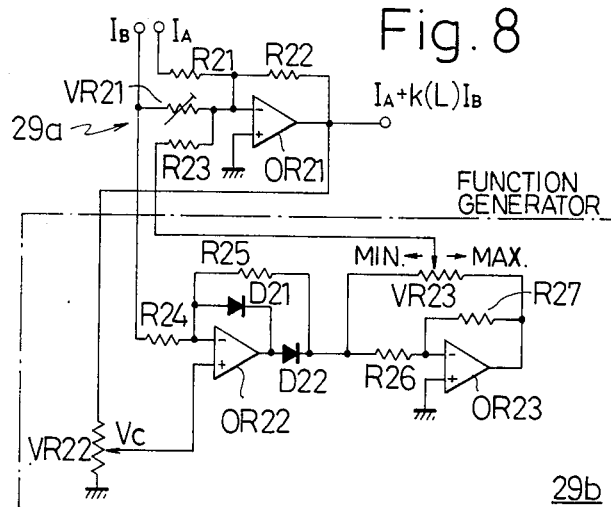
FIG. 8 shows a practical example of the correcting adder circuit and a function generating circuit in a further embodiment of the measuring system according to the present invention.
Figure 10:
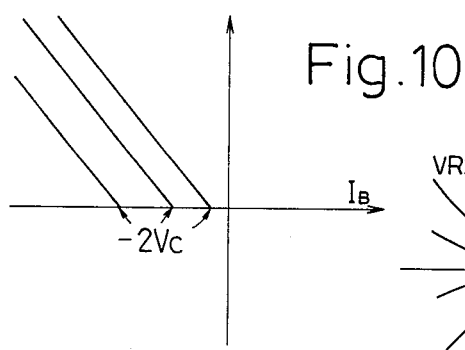
FIGS. 10 and 11 are graphs showing adjusting operation for realizing the linearity correction by providing a distance function in the system of FIG. 8.

Shown in FIG. 8 is a further embodiment of the present invention, in which the linearity correction is realized with a provision of the distance function k(L). In the present embodiment, a corrective adder circuit 29a similar to that of FIG. 2 is connected to a function generator 29b which includes operational amplifiers OP22 and OP23, variable resistors VR22 and VR23, resistors R24 to R27 and diodes D21 and D22, so that an output signal of an operational amplifier OP21 in the corrective adder circuit 29a will be divided at the variable resistor VR22 to generate a threshold voltage Vc which is expressed by the following equation:

$$Vc=(I_A+k(L)I_B)\alpha$$

where $\alpha$ is a divided-voltage constant. To the corrective adder circuit 29a and function generator 29b, a pair of positional output signals $I_A$ and $I_B$ are provided, which signals flow in mutually opposite directions and vary in their level depending on the displacement distance $\Delta l$ as shown in FIG. 9, one positional output signal $I_B$ being provided to an input terminal of the operational amplifier OP22 of the function generator 29b. In this case, an output of the operational amplifier OP22 varies in its broken point depending on the value of the threshold voltage Vc as shown in FIG. 10. That is, the operational amplifier OP22 compares the positional output signal $I_B$ with the threshold voltage set by adjusting the variable resistor VR22 and sends out an output $V_{OP22}$.

Referring to the input $I_B$ to the operational amplifier OP22, if $|I_B|>2Vc$, then $V_{OP22}=-(I_B+2Vc)$, and if $|I_B|<2Vc$, then $V_{OP22}=0$. Considering a case when $|I_B|=2Vc$, $$I_B=2Vc=(I_A+k(L)I_B)\alpha$$

$$\alpha=I_B/(I_A+k(L)I_B)$$

The divided-voltage constant $\alpha$ means substantially the measured distance signal, and a distance $\Delta lk$ at which the output of the operational amplifier OP22 affects the measured distance signal L can be set by adjusting the variable resistor VR22 so as to vary the divided voltage ratio. Further, to the variable resistor VR23, a voltage which has a polarity corresponding to inversion of the polarity of the output of the operational amplifier OP22 is applied so that, when the variable resistor VR23 is set at its middle value, the function generator 29b provides no function signal. At this time, therefore, the corrective adder circuit 29a generates an addition output, only with the correction constant k provided to the positional output signal $I_B$. On the other hand, when $|I_A|>2Vc$, the variable resistor VR23 is varied to provide to the correction constant k the function of the distance $\Delta lk$ affecting the measured distance signal, for varying the value of the correction constant k. As a result, it will be appreciated that, for example, the correction constant k can be suitably varied for a distance causing an error in PSD, and a more suitable linearity can be provided to the measured distance signal.

Figure 11:
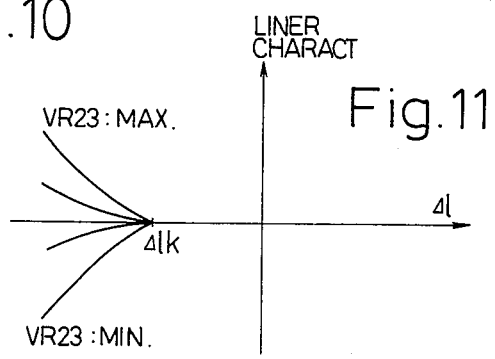

Accordingly, in the present embodiment, an output $V_{CF}$ of the corrective adder circuit 29a to which the function generator 29b is connected will be:

$$V_{CF}=I_A+(R/VR)I_B=I_A+kI_B \text{ when } |I_B|\leq 2Vc.$$

$$V_{CF}=I_A+\{(R/VR)\pm(R/R)\beta\}I_B=I_A+(k\pm\beta)I_B.$$
$$=I_A+k'I_B \text{ when } |I_B|>2Vc$$

where, $\beta$ is the divided voltage constant of the variable resistor VR22. That is, as clear from FIG. 11, the broken point $\Delta lk$ can be adjusted with use of the divided voltage constant $\alpha$ of the variable resistor VR22 and the value of k' when $\Delta lk>L$ can be adjusted with use of the divided voltage constant $\beta$ of the variable resistor VR23, so that the two variable resistors VR22 and VR23 adjusted enable it possible to perform a high degree of the linearity correction, and the correction arrangement can be simplified. In this case, it will be also understood that the linearity characteristic, that is, the linearity correction level with respect to the measured distance signal L can be suitably varied by adjusting the variable resistor VR23 in the range between its maximum and minimum values.

Figure 12:
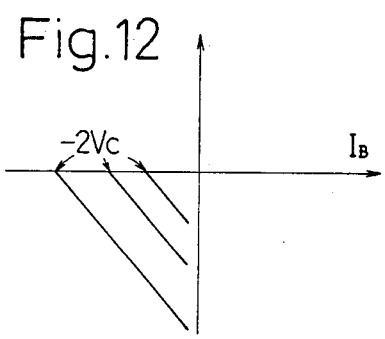
FIGS. 12 and 13 are graphs showing another adjusting operation.
Figure 13:
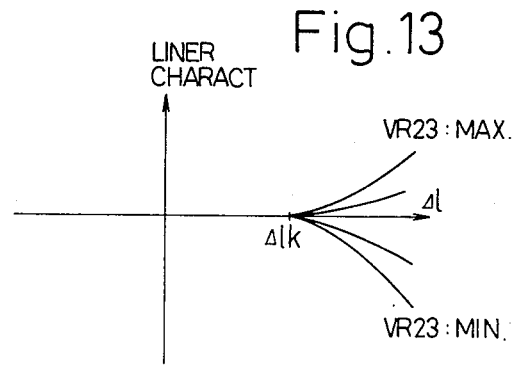
Figure 14:
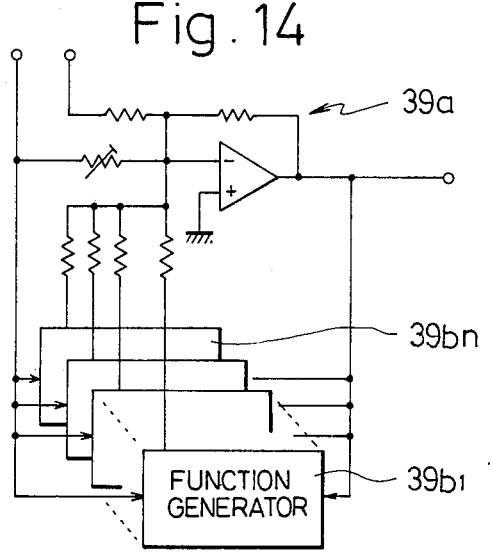
FIG. 14 shows another practical example of the correcting adder circuit and function generating circuit in the measuring system according to the present invention.

Further, when, in the measuring system of FIG. 8, the diodes D21 and D22 connected to the operational amplifier OP22 are made opposite in their rectifying direction, the operational amplifier OP22 can generate such an output as shown in FIG. 12 and the linearity connection can be carried out in a symmetrical manner with the foregoing adjustment (FIG. 13). Unlike the system of FIG. 8, when a plurality of function generating circuits 39b1 to 39bn are connected to a corrective adder circuit 39a as shown in FIG. 14, a further higher linearity correction can be realized. Even when a light-amount feed-back circuit 50 including a differential circuit 51, an integrating circuit 52 and a modulating circuit 53 is inserted between a function generator/corrective adder circuit 48 and a level detecting circuit 46b as shown in FIG. 15 to realize the linearity correction, the same operation as that of the system of FIGS. 6 and 8 can be achieved.

Figure 15:
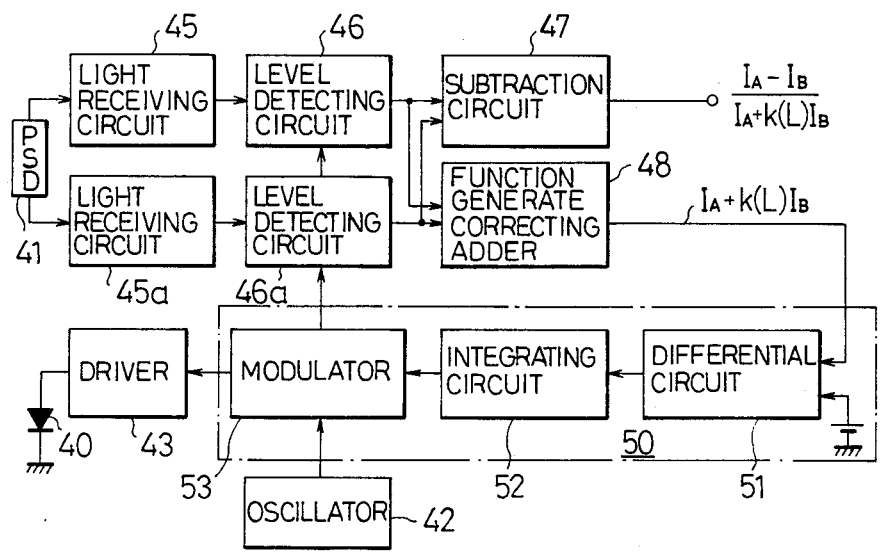

In the systems of FIGS. 6, 8 and 15, means corresponding to those in the system of FIG. 1 are denoted by the same reference numerals but added by 10, 20 and 30, respectively, and other means perform the same functions as those in the system of FIG. 1.

According to a further feature of the present invention, in addition to the above-mentioned functions, such a function as a correction of the linearity error caused by a difference in diffused reflection factor of the measuring object is provided. In the present embodiment shown in FIG. 16, in contrast to the system of FIG. 1, a function generating circuit 68b is connected in parallel to a divider circuit 69 and a linearity-error correcting circuit 68a is connected through a multiplying circuit 70 to the divider 69 and function generator 68b, which generator is arranged to generate a function $\gamma$ depending on any difference in the diffused reflection factor, this output function is multiplied with an output of the divider circuit 69 in the multiplying circuit 70, and then sent to the correcting circuit 68a to be provide with the correction constant, for carrying out the linearity correction.

It has been practically found that, when black and white papers are employed as the measuring objects, their operationally obtained values are different by about 1% due to a difference in the diffused reflection factor between the black and white papers. For this reason, the system is arranged so that an output $\gamma(I_A+I_B)$ of the function generating circuit 68b provides about 1% of the function $\gamma$ to the measured distance signal L, for realizing a much higher linearity correction (refer to FIG. 17).

Figure 18:
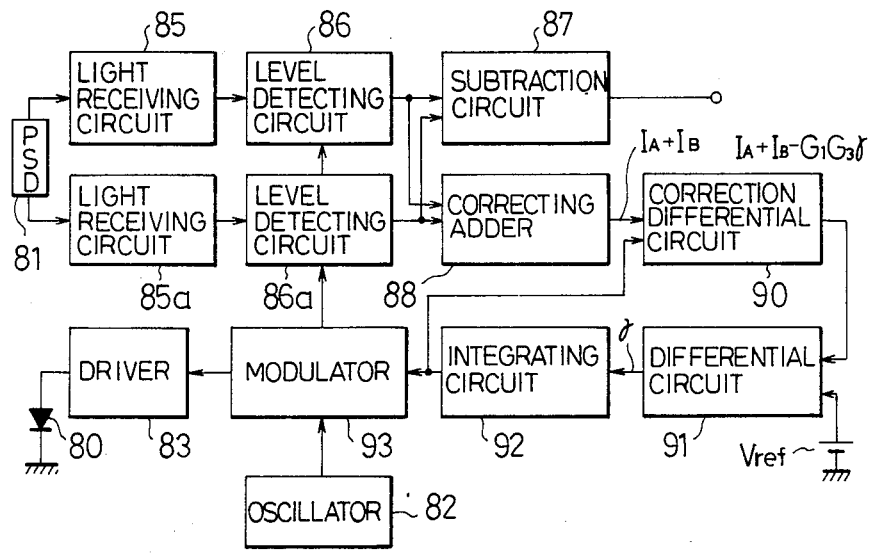
FIG. 18 is a block diagram showing yet another embodiment of the measuring system according to the present invention.
Figure 19:
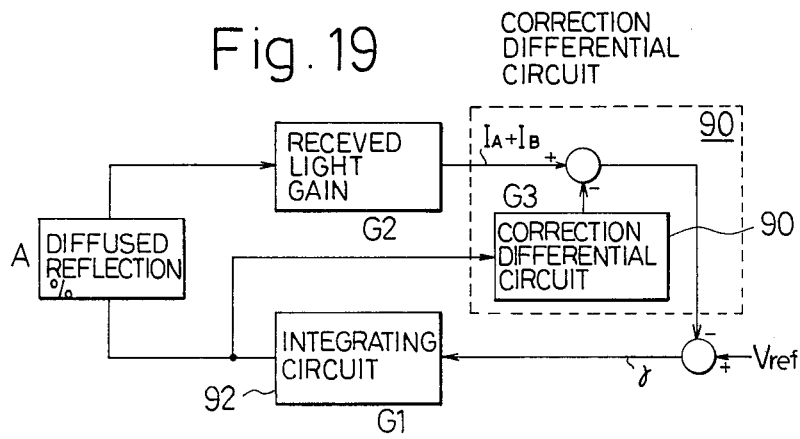
FIG. 19 is a block diagram of an arrangement for performing a light amount feed-back in the system of FIG. 18.

Referring to FIG. 18, there is shown an embodiment in which a linearity correcting arrangement for the diffused reflection error is added to the measuring system generating the measured distance signal through the feed-back of light amount. That is, in a light-amount feed-back circuit including a differential circuit 91, an integrating circuit 92 and a modulating circuit 93, a local feed-back is provided to an input signal $(I_A+I_B)$ of a correction differential circuit 90 by applying an output of the integrator 92 to the correction differential circuit 90, so as to provide the function $\gamma$ to a denominator of a value operated by an operational means. This correcting operation may be expressed in the form of such a simplified block diagram as shown by FIG. 19 or in the form of such a practical circuit diagram as shown in FIG. 20. In this case, the correction using the function $\gamma$ may be carried out according to following equations:

$$\gamma = V_{ref} - (AG_1G_2\gamma - G_1G_3\gamma)$$

Therefore, $$\begin{aligned} V_{ref} &= AG_1G_2\gamma - (G_1G_3 - 1)\gamma \\ &= I_A + I_B - [(G_1G_3 - 1)/\{AG_1G_2 - (G_1G_3 - 1)\}]V_{ref} \\ &= I_A + I_B - [(G_1G_3 - 1)\gamma/\{I_A + I_B - (G_1G_3 - 1)\gamma\}]V_{ref} \end{aligned}$$

Accordingly, an operational equation for the measured distance will be:

$$L = I_A - I_B/I_A + I_B - [\{(G_1G_3 - 1)\gamma\}/\{I_A + I_B - (G_1G_3 - 1)\gamma\}]V_{ref}$$

It will be seen from the above equation that the linearity correction is provided to the measured distance signal L by a term $I_A + I_B - (G_1G_3 - 1)\gamma$ in the above equation, in response to the magnitude of the amount of received light. In this connection, the value of the function $\gamma$ can be easily modified by varying, in particular, the gain of the correction differential circuit 91.

In the systems of FIGS. 16 and 18, means corresponding to those in the system of FIG. 1 are denoted by the same reference numerals but added by 50 and 70, respectively, and other means perform substantially the same functions as those of the system of FIG. 1.

Figure 21:
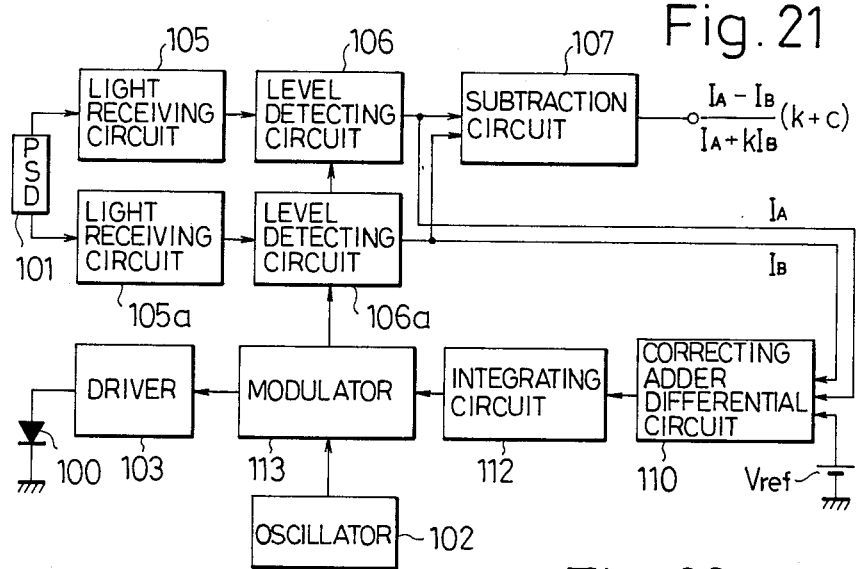
FIG. 21 is a block diagram showing still another embodiment of the measuring system according to the present invention.
Figure 22:
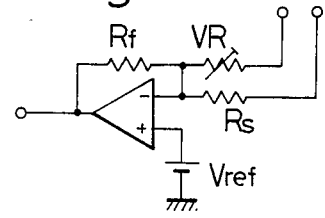
FIG. 22 is a practical example of a correcting adder/differential circuit in the system of FIG. 21.

According to still another feature of the present invention, there is provided an embodiment wherein an arrangement for varying the correction constant to provide a higher linearity to the measured distance signal L is added to such a correction constant providing arrangement as the measuring system of FIG. 1. Referring to FIG. 21, in contrast to the system of FIG. 1, a correcting adder/differential circuit 110 in place of the corrective adder circuit 18 is connected to a level detecting circuit 106a, and an output of the correcting adder/differential circuit 110 is fed through an integrating circuit 112 and a modulating circuit 113 back to the level detecting circuit 106a. The correcting adder/differential circuit 110 may be, more definitely, such circuit as shown in FIG. 22. In this case, the measured distance signal L is expressed by the following equations, assuming that a conditional formula $$\begin{cases} I_A/I_B = m \\ V_{ref}\{(Rf/VR//RS) + 1\} = I_A + (Rf/VR)I_B \end{cases}$$

is satisfied and that $Rf = RS$ and $Rf/VR = k$, $$L = I_A - I_B$$
$$= (m - 1)I_B$$
$$= [(m - 1)V\text{ref}\{(R_f/VR//R_s) + 1\}]/\{m + (R_f/VR)\}$$
$$= \{(I_A/I_B - 1)V\text{ref}(k + 2)\}/\{(I_A + I_B) + k\}$$
$$= \{(I_A - I_B)/CI_A + I_B)\}(k + 2)V\text{ref}$$

and the measured distance signal L is expressed in the form of multiplication of the signal by (k+2). Partial derivative $\partial L/\partial VR$ of the present measured distance signal L with respect to the resistance VR is:

$$\partial L/\partial VR = \}(m-1)(m-1)V\text{ref}\cdot k\}/\{(m+k)^2 VR\}$$

Figure 23:
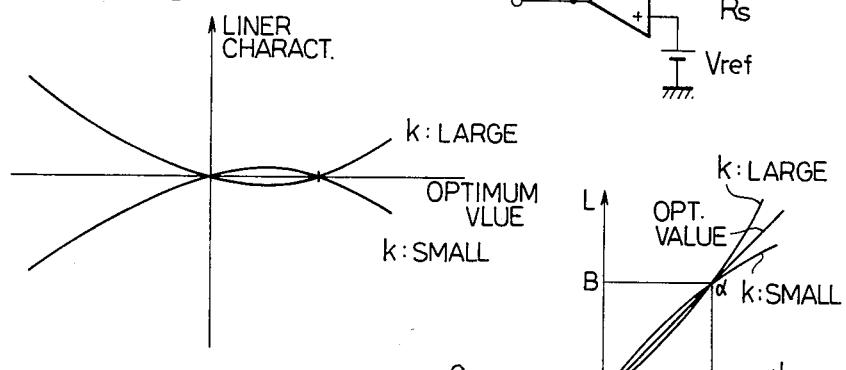
FIG. 23 is a graph showing relationship between the displacement distance of the measuring object and the linearity error for the adjusting operation of a constant of an optimum value in another aspect of the present invention.

Thus, the measured distance signal L does not vary from m=1 and 2. That is, referring to FIG. 23, the measured distance signal is expressed by a straight line when the correction constant k has an optimum value, by an upwardly bent curve when k is smaller than the optimum value, and by a downwardly bent curve when k is larger than the optimum value. In this case, as found from the above equation, there exist two points (satisfying $I_A=I_B$ and $I_A=2I_B$) at which a variation in the correction constant k causes no variation in the measured distance signal L.

Figure 24:
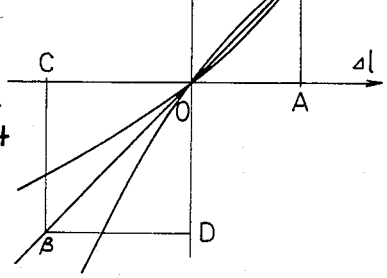
FIG. 24 is a graph showing relationship between the displacement distance of the measuring object and the measured distance signal for the adjusting operation of the linearity in another aspect of the invention.

Referring also to FIG. 24, a value B of the measured distance signal L at a point A satisfying $I_A=2I_B$ is found by moving the measuring object OBJ. Here, the value for the point $\alpha$ does not vary even when the correction constant k is varied. That is, a straight line connecting the origin 0 and the point $\alpha$ includes the measured distance signal of the linearity. Here, a value D of the measured distance signal L at a point $\beta$ of a distance C on an extension of the straight line connecting the origin 0 and point $\alpha$ is preliminarily obtained operationally and the correction constant k is so adjusted that, when the object OBJ is positioned at the distance C, the measured distance signal L have a value of D. As a result, the measured distance signal L obtained by the present arrangement becomes $\{(I_A+I_B)/(I_A+kI_B)\}(k+C)$, as a multiplication of the signal L operationally obtained by the system of FIG. 1 with a correction number (k+C), so that the correction constant only once adjusted allows the linearity correction to be completed, whereby required corrective adjustment time can be reduced to a large extent.

The correction number (k+C) can be applied to the measured distance signals L in all aspects of the system of FIG. 1 disclosed with reference to FIGS. 1-5. In this case, there can be obtained such seven types of the measured distance signals L subjected to the linearity correction by multiplying the measured distance signals L in the respective aspects with the correction number (k+C), as $\{(I_A-I_B)/(kI_A+I_B)\}(k+C)$, $\{I_A/(I_A+kI_B)\}(k+C)$, $\{I_A/(kI_A+I_B)\}(k+C)$, $\{(I_B/(I_A+kI_B)\}(k+C)$, $\{I_B/(kI_A+I_B)\}(k+C)$, $\{(I_A+I_B)/(I_A-kI_B)\}(k+C)$, and $\{(I_A+I_B)/(kI_A-I_B)\}(k+C)$.

Figure 25:
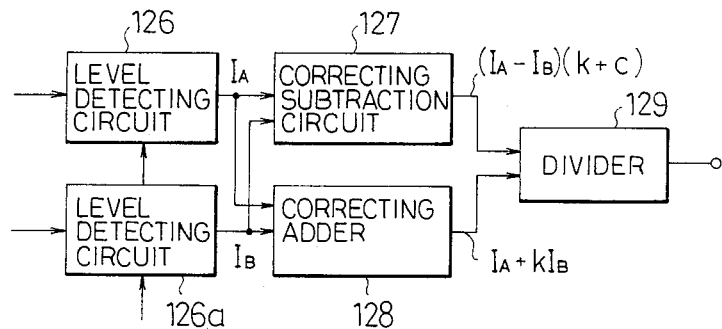
FIGS. 25 and 26 are block circuit diagrams showing still further embodiments of the measuring system according to the present invention.

Although the arrangement using the correcting adder/differential circuit 110 has been shown as an example in the measuring system of FIG. 21, such an arrangement as shown in FIG. 25 may be used, wherein outputs of a corrective subroutine circuit 127 and an adder circuit 128 are provided to a divider circuit 129 so as to operate $(I_A-I_B)(k+C)$ at the corrective subtraction circuit 127 and $(I_A+kI_B)$ at the corrective adder circuit 128, and the linearity correction similar to that of the system of FIG. 21 can be realized. In this case, too, such further seven types of the respective aspects may be employed in the same manner as described above.

Figure 26:
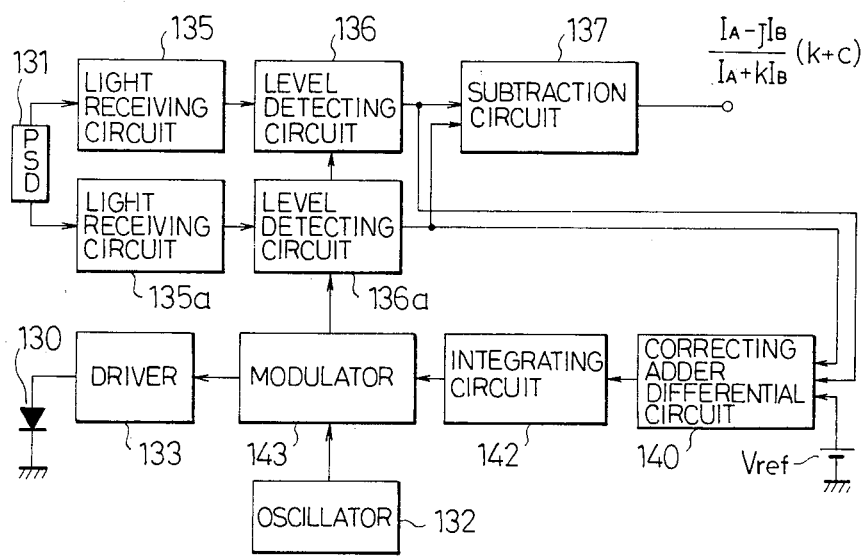

As shown in FIG. 26, substantially the same circuit arrangement as that of FIG. 21 may be modified so as to provide a gain difference J between the positional output signal $I_A$ and $I_B$, for properly modifying the reference distance C so that the measured distance output signal becomes zero. As a result, the reference distance can be modified as desired and a higher linearity correction can be realized. As in the above, the present case can also take the seven different aspects.

In the systems of FIGS. 21, 25 and 26, means corresponding to those in the foregoing respective systems are denoted by the same lowest digit reference numbers, and substantially the same functions are thereby performed.

What is claimed as our invention is:

1. An optical displacement measuring system utilizing a triangulation, comprising:
   means for projecting a light beam with a first optical axis onto an object whose displacement is to be measured,
   a light-reception optical means for passing therethrough as condensed light reflected by said object, on a second optical axis intersecting at an angle said first optical axis for said triangulation,
   a light receiving means disposed on said second optical axis for generating a pair of positional output signals having mutually opposite values and responsive to the position of a condensed light spot received from said light-reception optical means with respect to the center of said light receiving means;
   an operational means for performing addition and subtraction of said pair of positional output signals from said light receiving means and for obtaining a ratio between the added and subtracted positional output signals to generate a displaced distance signal, and
   correction means for correcting said pair of positional output signals with a mathematical correction for correcting nonlinearity of said measured displaced distance signal with respect to said displaced distance.

2. A system according to claim 1, wherein said mathematical correction is a correction constant which is set to reduce said nonlinearity of said measured displaced distance signal.

3. A system according to claim 2, wherein said correction means further includes a correction function with respect to a further linearity error due to a displaced spot position on said light receiving means, and said correction function is provided to said pair of positional output signals in said correcting means to reduce said nonlinearity of said measured displaced distance signal.

4. A system according to claim 2, wherein said correction constant is provided to either one of said pair of positional output signals subjected to said addition at said operational means.

5. A system according to claim 2, wherein said correction constant is provided to either one of said pair of positional output signals subjected to said subtraction at said operational means.

6. A system according to claim 3, wherein said correction constant is provided to either one of said pair of positional output signals subjected to said addition at said operational means.

7. A system according to claim 3, wherein said correction constant is provided to either one of said pair of positional output signals subjected to said subtraction at said operational means.

8. A system according to claim 1, wherein said mathematical correction is a correction function which reduces linearity error in said measured displaced distance signal due to a diffused reflection error of said light beam projected onto said object to be measured.

9. A system according to claim 8, wherein said operational means is provided with a light-amount feed-back circuit for operating said measured distance signal, and said correction function is provided by locally feeding part of a feed-back input to the operational means.

10. A system according to claim 2, wherein said correction constant is provided to be modifiable.

11. A system according to claim 10, wherein said modification of said correction constant is carried out by adding thereto a constant based on a value that does not vary even when the correction constant is changed in said measured displaced distance signal.

* * * * *